United States Patent [19]
Krishnan

[11] Patent Number: 4,477,637
[45] Date of Patent: Oct. 16, 1984

[54] FLAME RETARDANT ALKYLATED POLYCARBONATE COMPOSITIONS

[75] Inventor: Sivaram Krishnan, Moers, Fed. Rep. of Germany

[73] Assignee: Mobay Chemical Corporation, Pittsburgh, Pa.

[21] Appl. No.: 181,915

[22] Filed: Aug. 27, 1980

[51] Int. Cl.³ .............................................. C08G 63/76
[52] U.S. Cl. .................................... 525/469; 524/158; 524/159; 524/164; 524/170; 524/392; 524/420; 525/462; 525/470
[58] Field of Search ............... 525/461, 462, 469, 470; 524/164, 418

[56] References Cited

U.S. PATENT DOCUMENTS

| | | | |
|---|---|---|---|
| 3,023,101 | 2/1962 | Ossenbrunner et al. | 96/87 |
| 3,525,712 | 8/1970 | Kramer | 525/462 |
| 3,542,701 | 11/1970 | Van Raamsdonk | 521/120 |
| 3,940,366 | 2/1976 | Mark | 524/164 |
| 4,046,836 | 9/1977 | Adelmann et al. | 525/462 |
| 4,100,130 | 7/1978 | Freitag et al. | 524/418 |
| 4,134,936 | 1/1979 | Byrne et al. | 525/469 |
| 4,152,367 | 5/1979 | Binsack et al. | 525/462 |

FOREIGN PATENT DOCUMENTS 2750064 6/1978 Fed. Rep. of Germany .
2202119 3/1974 France .

*Primary Examiner*—Morton Foelak
*Attorney, Agent, or Firm*—Gene Harsh; Lawrence S. Pope; Aron Preis

[57] ABSTRACT

A flame resistant polycarbonate blend comprising an alkylated aromatic polycarbonate and a sulfur-bearing compound characterized in exhibiting V-0 flame resistance classification, according to UL-94, is provided. Further provided is a process for the preparation of such blend.

5 Claims, No Drawings

FLAME RETARDANT ALKYLATED POLYCARBONATE COMPOSITIONS

FIELD OF THE INVENTION

The invention is directed to polycarbonate resins and in particular to flame resistant polycarbonate blends and to a process for their preparation.

DESCRIPTION OF THE PRIOR ART

Polycarbonates derived from reactions involving organic dihydroxy compounds and carbonic acid derivatives have found extensive commercial application because of their excellent mechanical and physical properties. These thermoplastic polymers are particularly suited for the manufacture of molded products where impact strength, rigidity, toughness, thermal and dimensional stability as well as excellent electrical properties are required.

However, these polymers exhibit a brief though definite burning time when contacted with an open flame and do not meet a specified requirement for flammability resistance in applications where high temperatures and/or exposure to fire may be encountered. In addition, stabilizers or other functional additives which are normally used in polycarbonates will further modify the burning characteristics of the plastic to make them unacceptable where a certain flame retardance requirement is specified.

Also, stabilizers and functional additives such as monomeric phosphates, phosphoric acid esters and thiophosphoric acid esters containing halogenated alkyl radicals have been incorporated into polymers to increase their flame resistant properties. Metal salts have also been utilized to provide flame retardant characteristics to polycarbonates. Further, in aromatic polycarbonate resins, some of the phenolic diols used in the production thereof have chlorine or bromine atoms substituted on the aromatic ring to provide flame resistant characteristics to the final polycarbonate.

However, these stabilizers and halogenated phenolic diols have to be employed in such large quantities in order to obtain the flame resistant characteristics that they reduce the desirable physical properties of the polymers such as impact strength and even cause considerable deterioration in other physical properties such as resistance to hydrolysis and to deflection at elevated temperatures. A particular disadvantage in using the halogenated diols in the synthesis of the polycarbonate is the increased cost of the final resin to an economically undesirable extent. Sulfur additions to bisphenol A based polycarbonate resins have been reported in U.S. Pat. No. 4,100,130. Alkylated aromatic polycarbonates such as described in U.S. Pat. No. 3,879,348 are noted for their structural stability at high temperatures and for their relatively poor flame resistance. It is therefore an object of the invention to provide a polycarbonate resin that combines a high level of mechanical properties with improved flame resistance.

SUMMARY OF THE INVENTION

A polycarbonate composition comprising a blend of alkylated aromatic polycarbonate resin and a sulfur-bearing compound, characterized by its improved flame resistance and structural stability at elevated temperatures is provided. A preferred embodiment comprises an intimate blend of tetramethylated polycarbonate resin and a 4,4'-thiodiphenol or a sulfonyl diphenol based copolycarbonate.

DETAILED DESCRIPTION OF THE INVENTION

The polycarbonate compositions of the invention comprises:
(i) a high molecular weight polycarbonate resin characterized by structural units of the formula I

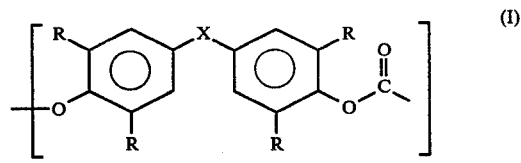

wherein
R is $-CH_3$, $-C_2H_5$ or $-CH(CH_3)_2$ and
X is a single bond, an alkylene or an alkylidene group having 1 to 5 carbon atoms, a cycloalkylene or a cycloalkylidene radical with 5 to 15 carbon atoms, an ether bond or a keto bond, and
(ii) a sulfur-bearing compound comprising a sufficient amount of sulfur to impart to the blend a degree of flame resistance, classified as V-0, according to the Underwriters Laboratory Bulletin No. 94 at ⅛".

A. Alkylated Aromatic Polycarbonates

The polycarbonate resins of formula I above, their properties and method of preparation have been described in U.S. Pat. No. 3,879,348 incorporated by reference herein. Briefly, they are obtainable by a reaction of the corresponding alkylated bisphenols with phosgene or with the bischlorocarbonic acid esters of the alkylated bisphenols in accordance with the phase boundary polycondensation process.

According to the phase boundary polycondensation process, polycarbonate resins are prepared by reacting aromatic dihydroxy compounds with an alkali metal hydroxide or with an alkaline earth metal oxide or hydroxide to form a salt. The salt mixture, in an aqueous solution or suspension is reacted with phosgene, carbonyl bromide, or bischloroformic esters of the aromatic dihydroxy compounds. An organic solvent is provided in the reaction admixture which is a solvent for the polymer but not for the aromatic dihydroxy salts. Chlorinated and non-chlorinated aliphatic or aromatic hydrocarbons are used as the organic solvents which dissolve the condensation product. Suitable solvents include cyclohexane, methylcyclohexane, benzene, toluene, xylene, methylene chloride, chloroform, carbon tetrachloride and chlorobenzene.

Monofunctional reactants such as monophenols may be used in order to limit the molecular weight. The alkylated polycarbonates can be branched by the incorporation of small amounts, preferably of between about 0.05 and 2.0 mol % (relative to diphenols employed), of trifunctional or more than trifunctional compounds, especially compounds with three or more phenolic hydroxyl groups.

Polycarbonates of this type are described, for example, in German Offenlegungsschriften (German Published Specifications) Nos. 1,570,533; 1,595,762; 2,116,974 and 2,113,347, British Patent Specification No. 1,079,821 and U.S. Patent Specification No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenyl methane, 2,2-bis[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl-4-methylphenol, 2-(4-hydroxyphenyl)-2-(2,4-dihydroxyphenyl)-propane, hexa(4-(4-hydroxyphenylisopropyl)-phenyl) orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

In order to accelerate the reaction, catalysts such as tertiary amines, quaternary ammonium, phosphonium or arsonium salts and the like may be used. The reaction temperature should be about $-20°$ to $+150°$ C., preferably about $0°$ C. to $100°$ C.

The following list exemplifies suitable bisphenols for the manufacture of the polycarbonate resin of formula I:
Bis-(3,5-dimethyl-4-hydroxyphenyl)-methane, bis-(3,5-diisopropyl-4-hydroxyphenyl)-methane, 2,2-bis-(3-methyl-5-isopropyl-4-hydroxyphenyl)-propane, 2,2-bis-(3,5-dimethyl-4-hydroxyphenyl)-propane, 2,2-bis-(3,5-diethyl-4-hydroxyphenyl)-propane, 3,3-bis-(3,5-dimethyl-4-hydroxyphenyl)-pentane, 1,1-bis-(3,5-dimethyl-4-hydroxyphenyl)-cyclohexane, 1,4-bis-(3,5-dimethyl-4-hydroxyphenyl)-cyclohexane, bis-(3,5-dimethyl-4-hydroxyphenyl)-ether, and bis-(3,5-dimethyl-4-hydroxyphenyl)-carbonyl.

Alkylated polycarbonates of formula I are characterized by their structural stability at high temperatures as measured by heat distortion temperature, which is higher than their non-alkylated counterparts as well as by their relatively poor flame resistance.

B. Sulfur-Bearing Compounds

Sulfur-bearing compounds, suitable in the practice of the invention include any of the ones enumerated below or their combinations.
1. Elemental sulfur.
2. Monomeric compounds such as
  (a) Sulfonates of the structural formulae

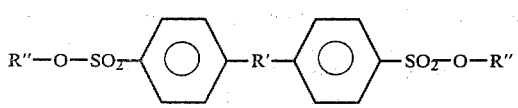

I.

or

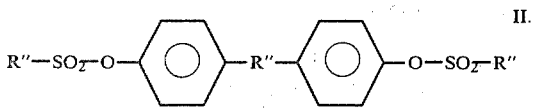

II.

wherein

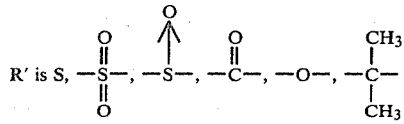

and

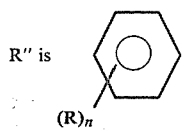

wherein R is a $C_1$ to $C_5$ alkyl or a halogen and n is 1 to 5, or R'' is

or an alkyl.
(b) Sulfonamides of the structural formulae

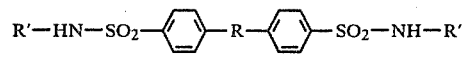

III.

or

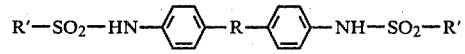

IV.

wherein

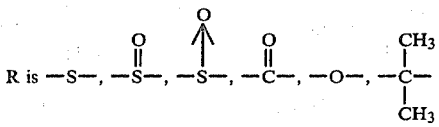

and

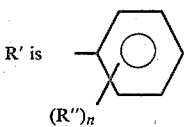

where R'' is a $C_1$ to $C_4$ alkyl or halogen atom and n is 1 to 5.
(c) Sulfones of the structural formula

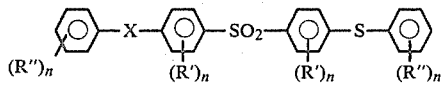

V.

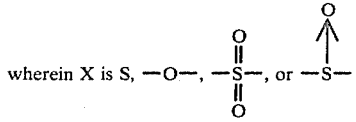

and R' and R'' independently are $C_1$–$C_4$ alkyl or a halogen and n is 0 to 4.
(d) Sulfonhydrazides of the structural formula

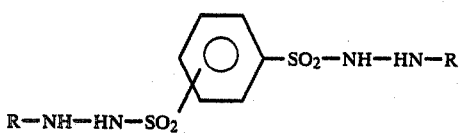  VI.

wherein R is an alkyl substituted or a halogen substituted phenyl, the substitution being from 1 to 4.

(e) Sulfides of the structural formulae

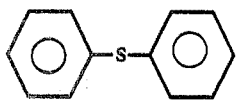  VII.

or

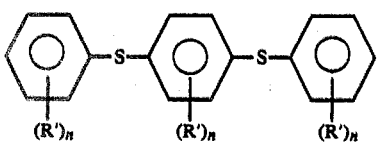  VIII.

wherein R' and n are as defined for formula V above.

3. Polymeric compounds such as
(a) Polyethersulfone of the structural formulae

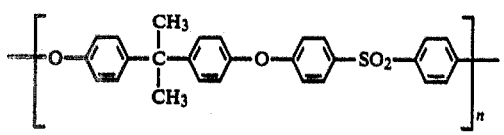  IX.

exemplified by Union Carbide's UDEL® or

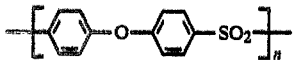  X.

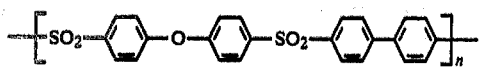  XI.

where both X and XI are exemplified by Imperial Chemical Industries' (ICI), VITREX®.

(b) Polysulfone of the structural formula

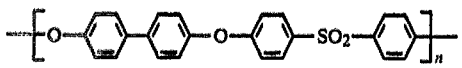  XII.

exemplified by Union Carbide's RADEL®.

(c) Polyphenylene sulfide of the structural formula

  XIII.

exemplified by Phillips Chemical Corporation's RYTON®.

(d) Polysulfonates of the structural formula

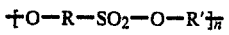  XIV.

wherein R and R' are independently either an aryl or an alkyl, preferably an aryl.

(e) Polysulfones of the structural formula

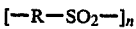  XV.

where R is an aryl, 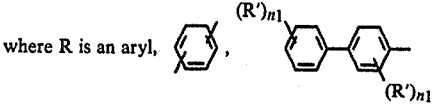

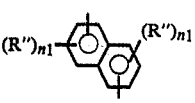

wherein $n_1$ is 1 to 4, and R' and R'' independently are $C_1$ to $C_5$ alkyl, or a halogen atom, preferably Cl or Br.

(f) Polysulfonamides of the structural formula

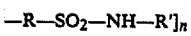  XVI.

where R and R' are aryls.

(g) Polyether sulfones of the structural formula

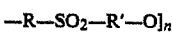  XVII.

wherein R is an aryl radical such as

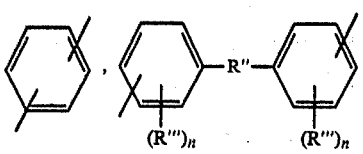

where R' is aryl, diphenyl where R'' is $-\overset{CH_3}{\underset{CH_3}{C}}-$, $-S-$, SO, $SO_2$, $\overset{O}{\underset{}{C}}$, or $-O-$.

(h) Polyether sulfone ketone of the structural formula

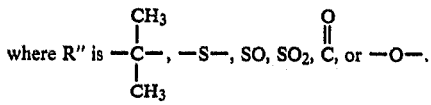  XVIII.

where R, R' and R'' independently are phenyl, a biphenyl or

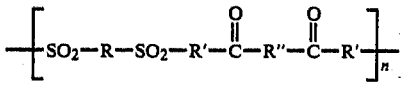

wherein R''' is S, CO, O, $-\overset{CH_3}{\underset{CH_3}{C}}-$, SO or $SO_2$.

(i) Polysulfides of the structural formula

—R—S]$_n$  XIX.

where R is a phenyl, a biphenyl or

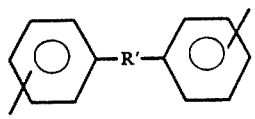

wherein R' denotes S, O, —C(=O)— or $$\begin{array}{c} CH_3 \\ | \\ -C- \\ | \\ CH_3 \end{array}$$

(j) Polysulfonimides of the structural formula

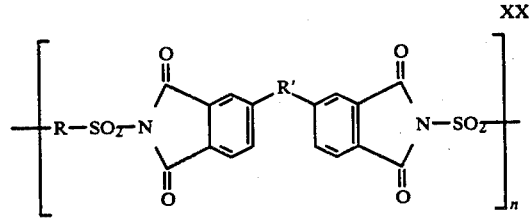   XX.

wherein R is a phenyl and

R' is $-\underset{\underset{CH_3}{|}}{\overset{\overset{CH_3}{|}}{C}}-$, S, SO, SO$_2$, —CO—.

(k) Polysulfonyl hydrazides of the structural formula

—R—SO$_2$—NH—NH—SO$_2$—R—SO$_2$]$_n$   XXI.

where R is an alkyl or an aryl.

(l) Polysulfonyl-ureas

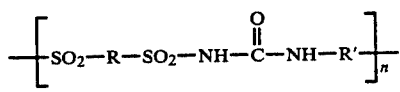

wherein R is an aryl and R' is an aryl or an alkyl.

4. Copolycarbonates based on the following sulfur-bearing diphenols

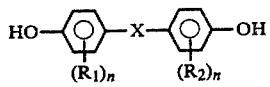

XXII.

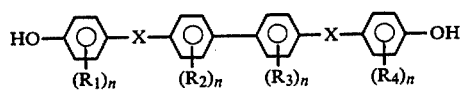

XXIII.

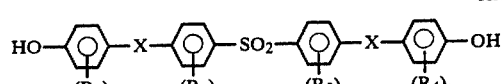

XXIV.

wherein
X is S, SO or SO$_2$ and
R$_1$ to R$_4$ independently are H, Cl, Br, C$_1$ to C$_4$ alkyl, preferably C$_1$ to C$_4$ alkyl, or H and,
n is from 0 to 2.

Copolycarbonates of group 4 above are obtainable by any of the processes known for the preparation of polycarbonates. Some of these processes are disclosed in German Pat. Nos. 962,274 and 1,046,311; and U.S. Pat. Nos. 2,964,794; 2,970,131; 2,991,273; 2,999,835; 2,999,846; 3,028,365; 3,153,008; 3,187,065; 3,215,668; and 3,248,414, all incorporated herein by reference. The preferred process is the interfacial polycondensation process described above. In any of the processes, a carbonic acid derivative is made to react with a mixture of diphenols, comprising any of the diphenols of group 4 above and any of the sulfur-free diphenols commonly used in the preparation of polycarbonates.

Among the sulfur-free conventionally used diphenols are: hydroquinone, resorcinol, dihydroxydiphenyls, bis-(hydroxyphenyl)-alkanes, bis-(hydroxyphenyl)-cycloalkanes, bis-(hydroxyphenyl)-ethers, bis-(hydroxyphenyl)-ketones, and α,α-bis-(hydroxyphenyl)-diisopropylbenzenes, as well as their nuclear-alkylated and nuclear-halogenated compounds. These and further suitable aromatic dihydroxy compounds are described, for example, in U.S Pat. Nos. 3,028,365; 2,999,835; 3,148,172; 3,271,368; 2,991,273; 3,271,367; 3,280,078; 3,014,891; and 2,999,846, all incorporated herein by reference; in German Offenlegungsschriften (German Published Specifications) 1,570,703; 2,063,050; 2,063,052; 2,211,956; and 2,211,957; in French Patent Specification 1,561,518; and in the monograph, H. Schnell, "Chemistry and Physics of Polycarbonates," Interscience Publishers, New York, 1964.

Preferred diphenols are those of the formula XXV

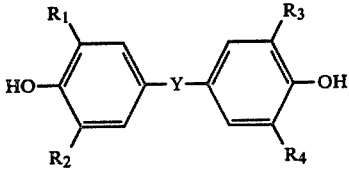   XXV.

wherein
R$_1$–R$_4$ independently are H, Cl, Br, or C$_1$–C$_4$ alkyl with the proviso that in the latter case at least one of R$_1$–R$_4$ is a hydrogen atom,
Y is C$_1$ to C$_8$ alkylene, C$_2$ to C$_8$ alkylidene, C$_5$ to C$_{15}$ cycloalkylene, C$_5$ to C$_{15}$ cycloalkylidene, a single bond, —O—, —CO— or:

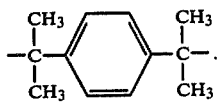

The copolycarbonates derived from the diphenols of group 4 above, providing the sulfur source for the novel blend of the invention may be branched by the incorporation of small amounts, preferably between 0.05 and 2.0 mol percent (relative to the total amount of diphenols) of trifunctional compounds or compounds whose functionality is greater than three, especially compounds having three or more phenolic hydroxy groups.

Monofunctional compounds, such as monophenols may be incorporated in small amounts in order to limit the molecular weight and to prevent cross-linking.

C. The Blend

Alkylated polycarbonates and sulfur-bearing compounds are, in accordance with the practice of the invention, intimately blended in any of the known, suitable means for mixing such as kneaders, single or twin screw extruders, mills and the like.

Regardless of the sulfur source, the polycarbonate blend of the invention may be prepared so as to contain between 0.1 and 5, and preferably between 0.4 and 2 percent by weight, of sulfur. The preferred embodiments comprise blends of tetramethylated polycarbonates and effective amounts of either 4,4'-thiodiphenol or sulfonyl diphenol based copolycarbonates.

Surprisingly, the polycarbonate blends of the invention exhibit flame resistance levels which are superior to that of sulfur-bearing bisphenol A based copolycarbonates.

The blends of the present invention are noted also for their relatively high structural stability at elevated temperatures, a characteristic unshared by sulfur-bearing bisphenol based copolycarbonates (compare the corresponding values of the heat deflection temperature).

The blends of the invention may contain additives such as glass fibers, pigments, dyes, UV stabilizers, mold release agents and fillers.

The invention is demonstrated by the Examples below:

EXAMPLES 1 to 6

Preparation of an aromatic, sulfur containing copolycarbonate.

Aromatic copolycarbonate of 4,4'-thiodiphenol (X=S in formula XXII) were prepared by the phosgenation of mixtures of disodium salts of 2,2'-bis-(4-hydroxyphenyl) propane (BPA) and 4,4'-thiodiphenol (TDP). Table 1 lists the various mixtures used and the melt indices of their corresponding copolycarbonates-measured according to ASTM D-1238 condition 0.

TABLE 1

| EXAMPLE | BPA/TDP MOL % | MELT INDEX g./10 MIN. |
|---------|---------------|------------------------|
| 1 | 95/5 | 2.5 |
| 2 | 90/10 | 4.8 |
| 3 | 85/15 | 3.5 |
| 4 | 75/25 | 8.5 |
| 5 | 70/30 | 6.6 |
| 6 | 85/15 | 13.0 |

EXAMPLES 7 to 12

Copolycarbonates of TDP prepared as described in Examples 1 through 6 above were blended with methylpolycarbonate (corresponding to formula I where X is isopropylidene and R is CH₃) in 50/50 weight percent ratios. The polyblends were evaluated in terms of their mechanical properties and flame resistance and the results are presented in Table 2.

TABLE 2

| EXAMPLE | CONTROL (a) | CONTROL (aa) | 7 | 8 | 9 | 10 | 11 | 12 |
|---------|-------------|--------------|---|---|---|----|----|----|
| % sulfur | 0 | 0 | 0.365 | 0.73 | 1.09 | 1.82 | 2.19 | 1.09 |
| % TDP in the blend | 0 | 0 | 2.5 | 5.0 | 7.5 | 12.5 | 15.0 | 7.5 |
| Melt index of the blend[b] (g/10 min.) | 1.8 | 3.5 | 2.8 | 3.4 | 3.3 | 4.9 | 4.4 | 4.6 |
| Izod Impact Strength (ft.lb/in) Notched Izod | | | | | | | | |
| ⅛" | 0.45 | 15.0 | 0.81 | 0.78 | 0.88 | 0.74 | 0.89 | 0.78 |
| ¼" | 0.44 | 2.0 | 0.79 | 0.74 | 0.80 | 0.73 | 0.76 | 0.72 |
| Critical thickness (mils) | <100 | 210 | <100 | <100 | <100 | <100 | <100 | <100 |
| Burning characteristics (UL-94) 1/16" class | | V-2 | 60% V-1 20% V-2 | 40% V-1 60% V-2 | 60% V-0 40% V-1 | 80% V-0 20% V-1 | 40% V-0 60% V-1 | 60% V-1 40% V-2 |
| ⅛" class Fails | V-2 | V-2 | V-0 | V-0 | V-0 | V-0 | V-0 | V-0 |
| Ave. burn time | | | 1.4 | 3.5 | 2.3 | 1.2 | 3.3 | 1.3 |

(aa) bisphenol A polycarbonate
(a) methylpolycarbonate (b) measured by ASTM D = 1238 condition 0

EXAMPLES 13 THROUGH 17

Copolycarbonates based on sulfonyl diphenol (SDP) (correspond to formula XXII where X is SO₂) have been prepared in accordance with the interfacial polycondensation synthesis discussed above. These were blended with methyl polycarbonate to yield compositions of differing sulfur contents. The blends were evaluated in terms of their melt indices, impact properties and flame resistance and the findings are reported in Table 3.

TABLE 3

| EXAMPLE | Control[a] | 13 | 14 | 15 | 16 | 17 | Control[b] | Control[b] | Control[c] |
|---------|-----------|------|------|------|------|------|-----------|-----------|-----------|
| % Sulfur | 0 | 0.96 | 0.64 | 0.32 | 0.32 | 0.96 | 0.69 | 1.28 | 0 |
| Melt flow[b] rate (g/10 min) | 1.8 | 4.6 | 3.9 | 3.6 | 3.0 | 4.9 | 6.0 | 5.4 | 3-5 |
| Impact strength (ft.lb/in) (notched izod) | | | | | | | | | |
| ⅛" | 0.45 | 1.28 | 0.68 | 0.52 | 0.63 | 0.73 | 15.17 | 14.04 | 15.0 |
| ¼" | 0.44 | 1.13 | 0.76 | 0.39 | 0.73 | 0.74 | 3.09 | 3.29 | 2.0 |
| Critical thickness (mils) | <100 | <100 | <100 | <100 | <100 | <100 | <222 | <217 | <210 |

TABLE 3-continued

| EXAMPLE | Control[a] | 13 | 14 | 15 | 16 | 17 | Control[b] | Control[b] | Control[c] |
|---|---|---|---|---|---|---|---|---|---|
| Heat deflection temperature, 1.81 MPa, °C. | 172 | 150.1 | 157.8 | 164.3 | 157.8 | 148.3 | 137.9 | 136.1 | 135 |
| Burning Characteristics UL-94 | | | | | | | | | |
| ⅛" class fails | V-2 | V-2 | V-0 | V-0 | V-0 | V-0 | V-2 | V-2 | V-2 |
| Ave.burn time (sec) | | | 1.2 | 4.2 | 0.8 | 1.6 | | | |
| 1/16" class fails | V-2 | V-2 | V-2 | V-2 | V-2 | V-2 | | | |

[a] methylpolycarbonate
[b] bisphenol A/SDP copolycarbonate
[c] bisphenol A based polycarbonate

What is claimed is:

1. A flame resistant polycarbonate blend comprising:
(i) a polycarbonate resin characterized by the repeating unit

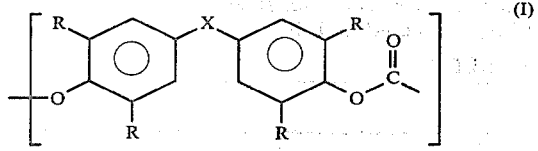

wherein
X denotes a single bond, an alkylene or an alkylidene group having 1 to 5 carbon atoms, a cycloalkylene or cycloalkylidene radical with 5 to 15 carbon atoms, an ether bond or a keto bond,
R denotes —$CH_3$, —$C_2H_5$ or —$CH(CH_3)_2$; and
(ii) a sulfur-bearing copolycarbonate, based on the reaction product of a carbonic acid derivative and a mixture of a sulfur-free aromatic diphenol and a sulfur-bearing diphenol selected from a group consisting of

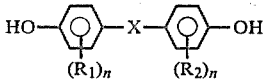 XXII

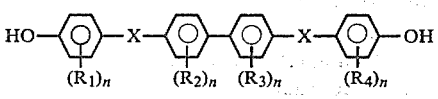 XXIII and

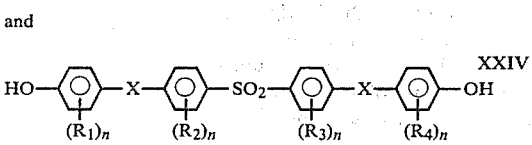 XXIV wherein
X is either S, SO, or $SO_2$,
$R_1$ to $R_4$ independently are H, Cl, Br and $C_1$ to $C_4$ alkyl, and
n is from 0 to 2
said blend characterized in exhibiting flame resistance classified V-O by the UL-94 test at ⅛" in the absence of any other flame retardant.

2. The blend of claim 1 wherein said sulfur-bearing copolycarbonate is based on the reaction product of a carbonic acid derivative and a mixture of a sulfur-free aromatic diphenol and sulfur-bearing aromatic diol of the formula

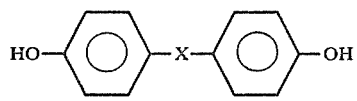

wherein
X is either S, SO, or $SO_2$.

3. The blend of claim 2 wherein said mixture is of 2,2-bis(4-hydroxy phenyl) propane and

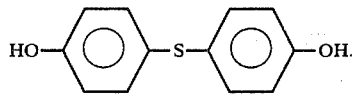

4. A process for preparing a flame resistant polycarbonate blend comprising mixing a polycarbonate resin characterized by the structural formula I

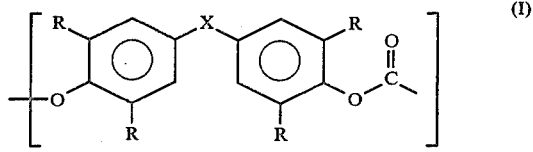

wherein
X denotes a single bond, an alkylene or an alkylidene group having 1 to 5 carbon atoms, a cycloalkylene or cycloalkylidene radical with 5 to 15 carbon atoms, an ether bond or a keto bond,
R denotes —$CH_3$, —$C_2H_5$ or —$CH(CH_3)_2$, and an effective amount of a sulfur-bearing copolycarbonate based on the reaction product of a carbonic acid derivative and a sulfur-free aromatic diphenol admixed with a sulfur-bearing diphenol selected from the group consisting of

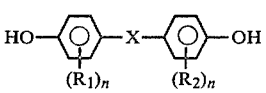 XXII

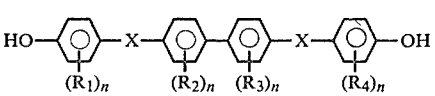 XXIII and

-continued

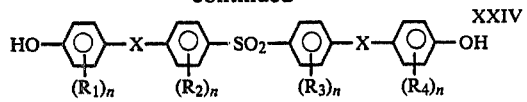
XXIV wherein
X is either S, SO, or $SO_2$,
$R_1$ to $R_4$ independently are H, Cl, Br and $C_1$ to $C_4$ alkyl, and
n is from 0 to 2 said blend characterized in exhibiting V-O classification in accordance with the flame resistance test UL-94 in the absence of any other flame retardant.

5. The process of claim 4 wherein said sulfur-bearing copolycarbonate is based on the reaction product of a carbonic acid derivative and a mixture of a sulfur-free aromatic diphenol and a sulfur-bearing aromatic diol of the formula

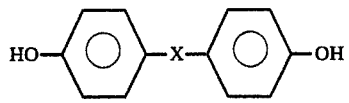

wherein
X is either S, SO, or $SO_2$.

* * * * *